Figure 3:
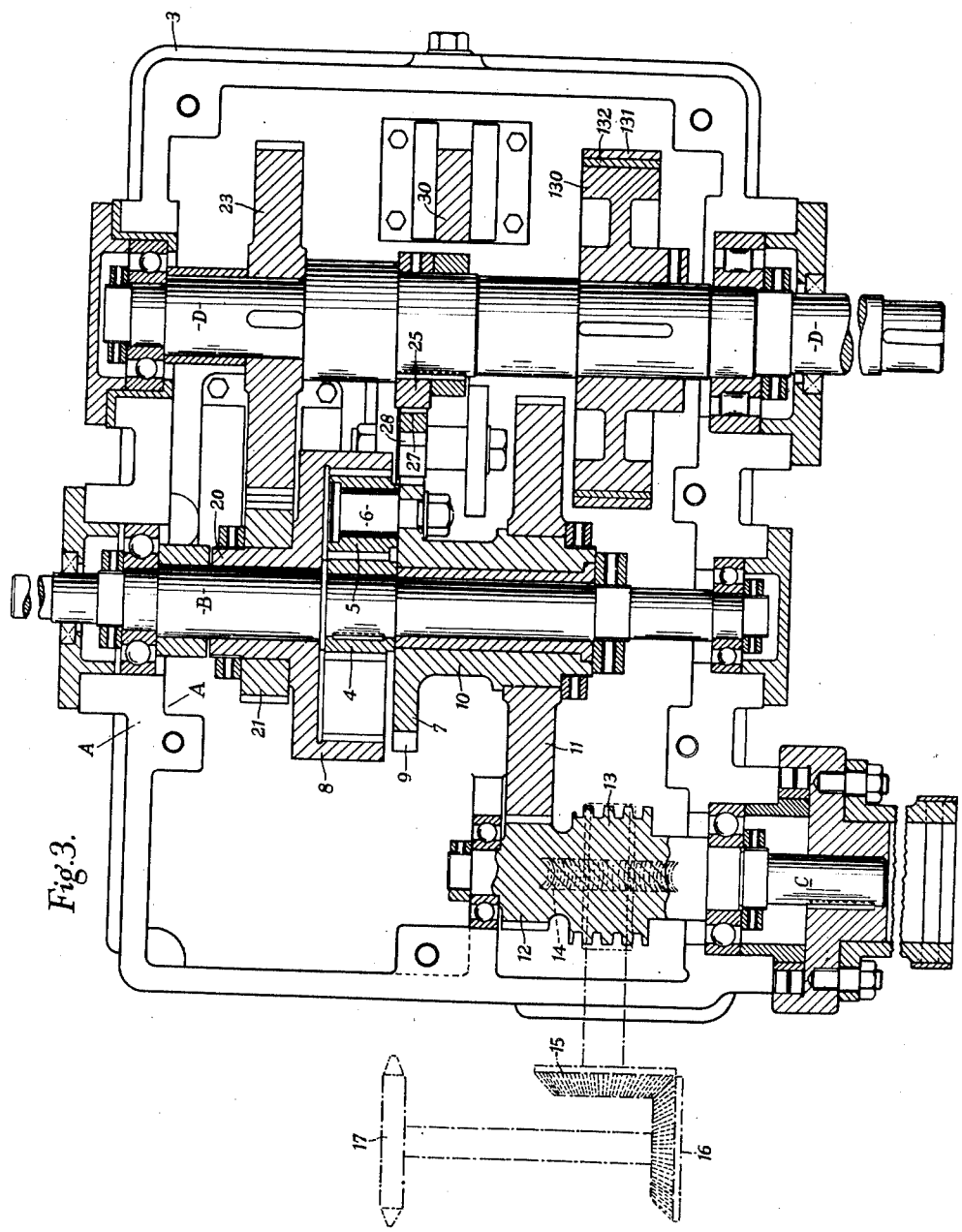

April 5, 1955  J. A. WAKEFIELD  2,705,509
MACHINES FOR MANUFACTURING WIRE FABRIC
Filed Oct. 3, 1951  11 Sheets-Sheet 1
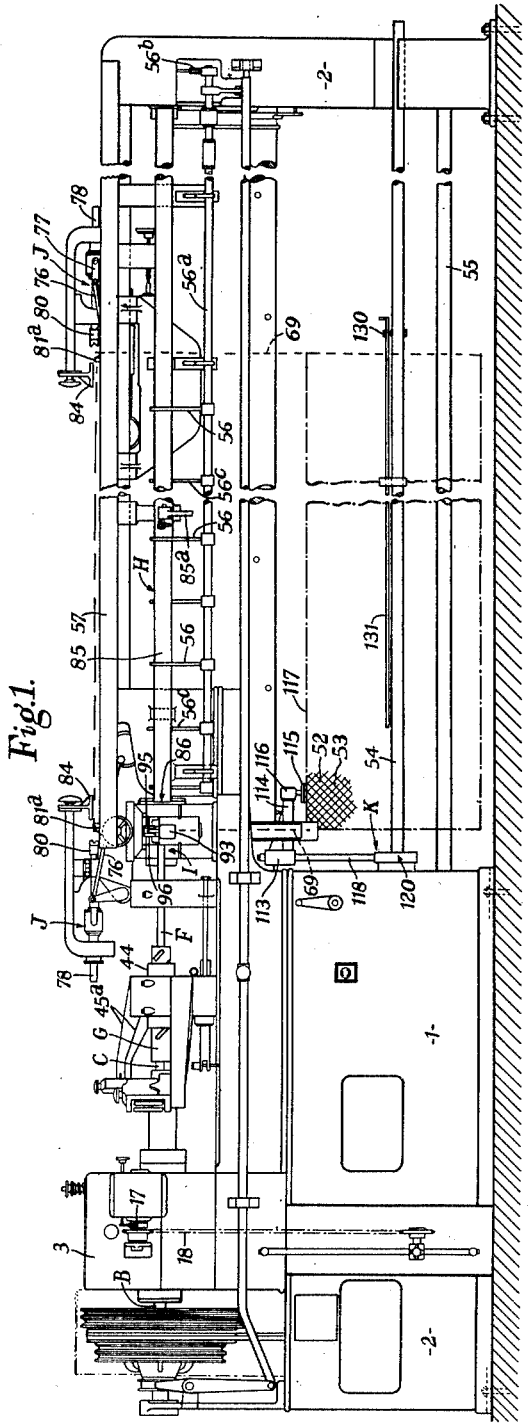
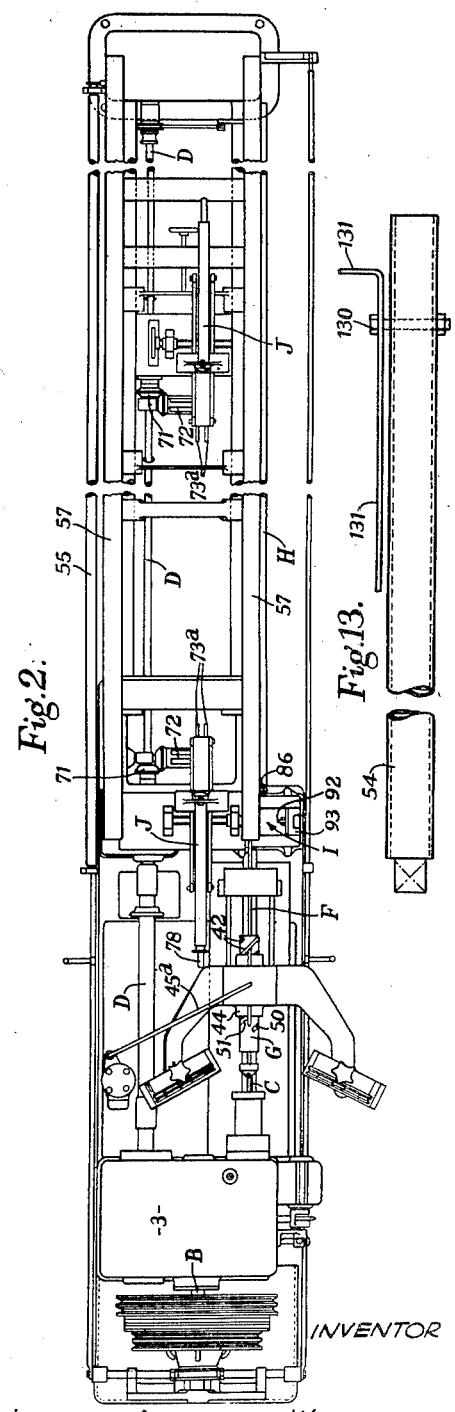
INVENTOR
JOSEPH ANTHONY WAKEFIELD
BY
ATTORNEY

JOSEPH ANTHONY WAKEFIELD INVENTOR

April 5, 1955   J. A. WAKEFIELD   2,705,509
MACHINES FOR MANUFACTURING WIRE FABRIC
Filed Oct. 3, 1951   11 Sheets-Sheet 3
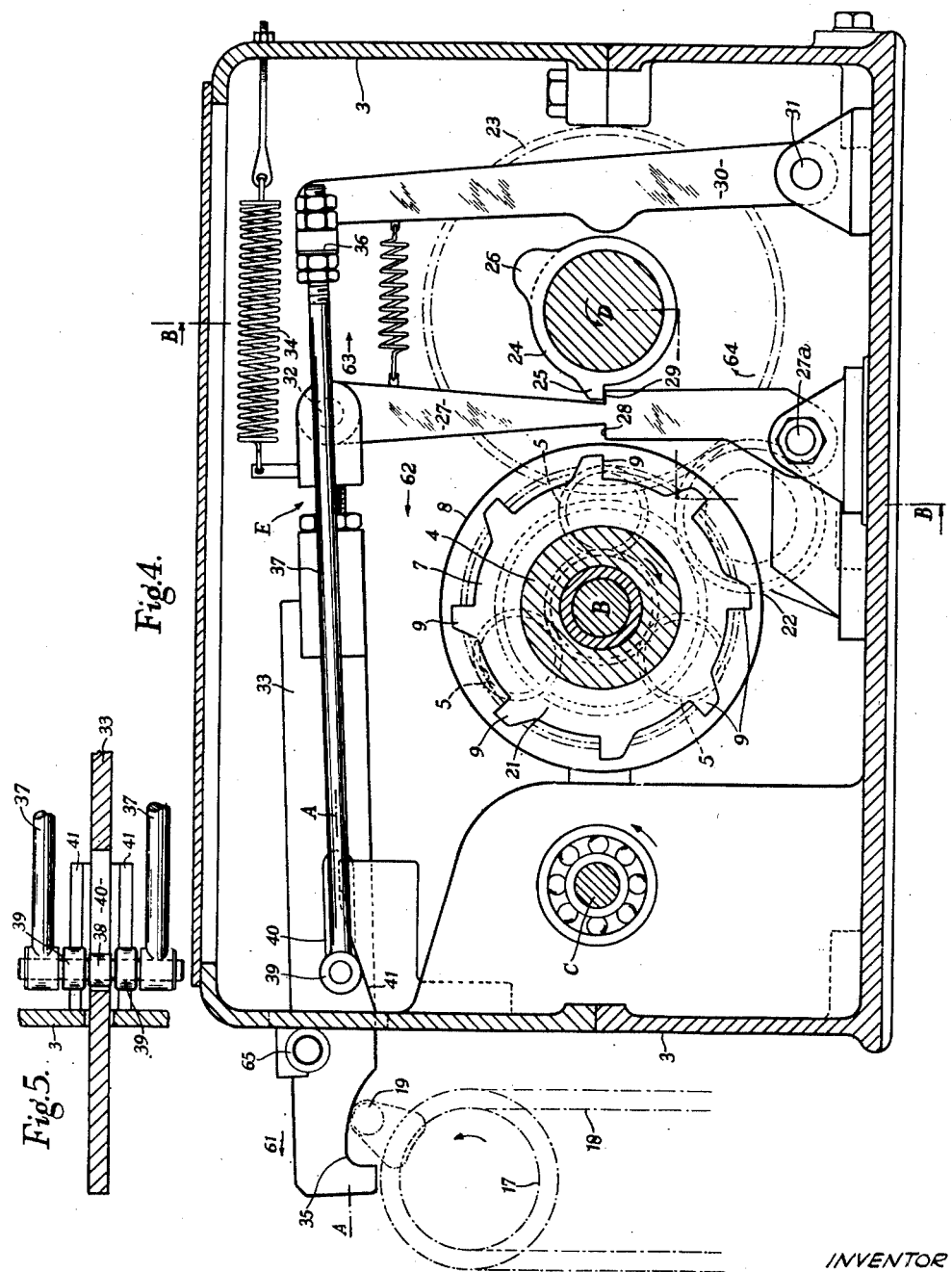
INVENTOR
JOSEPH ANTHONY WAKEFIELD
BY
ATTORNEY

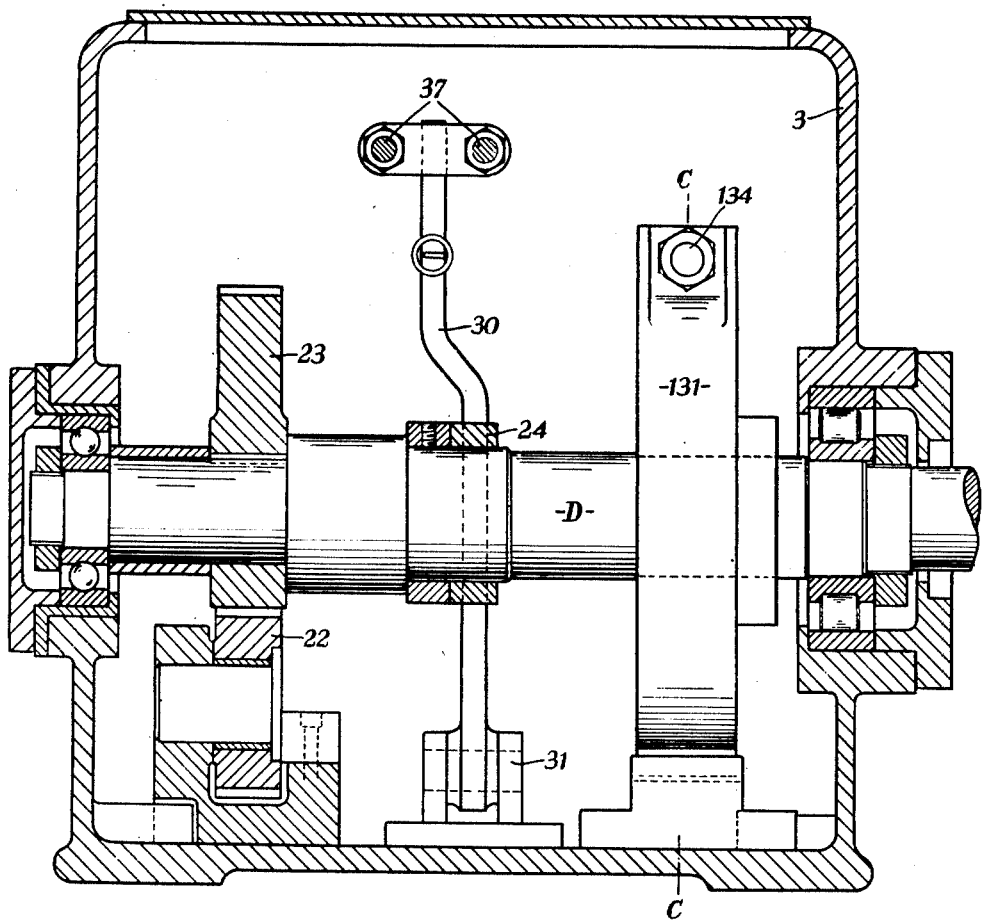

April 5, 1955  J. A. WAKEFIELD  2,705,509
MACHINES FOR MANUFACTURING WIRE FABRIC
Filed Oct. 3, 1951  11 Sheets-Sheet 5

INVENTOR
JOSEPH ANTHONY WAKEFIELD
BY
ATTORNEY

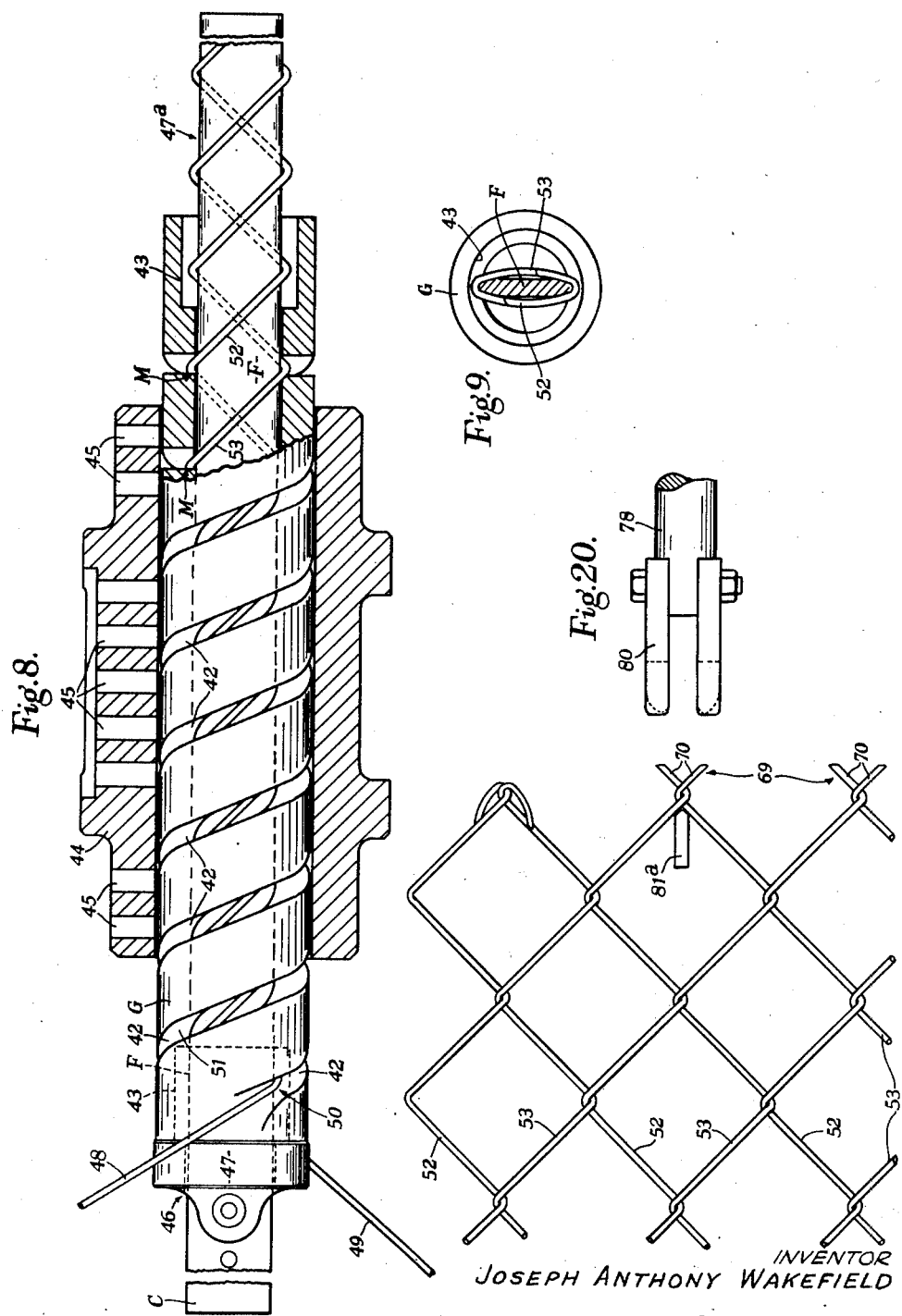

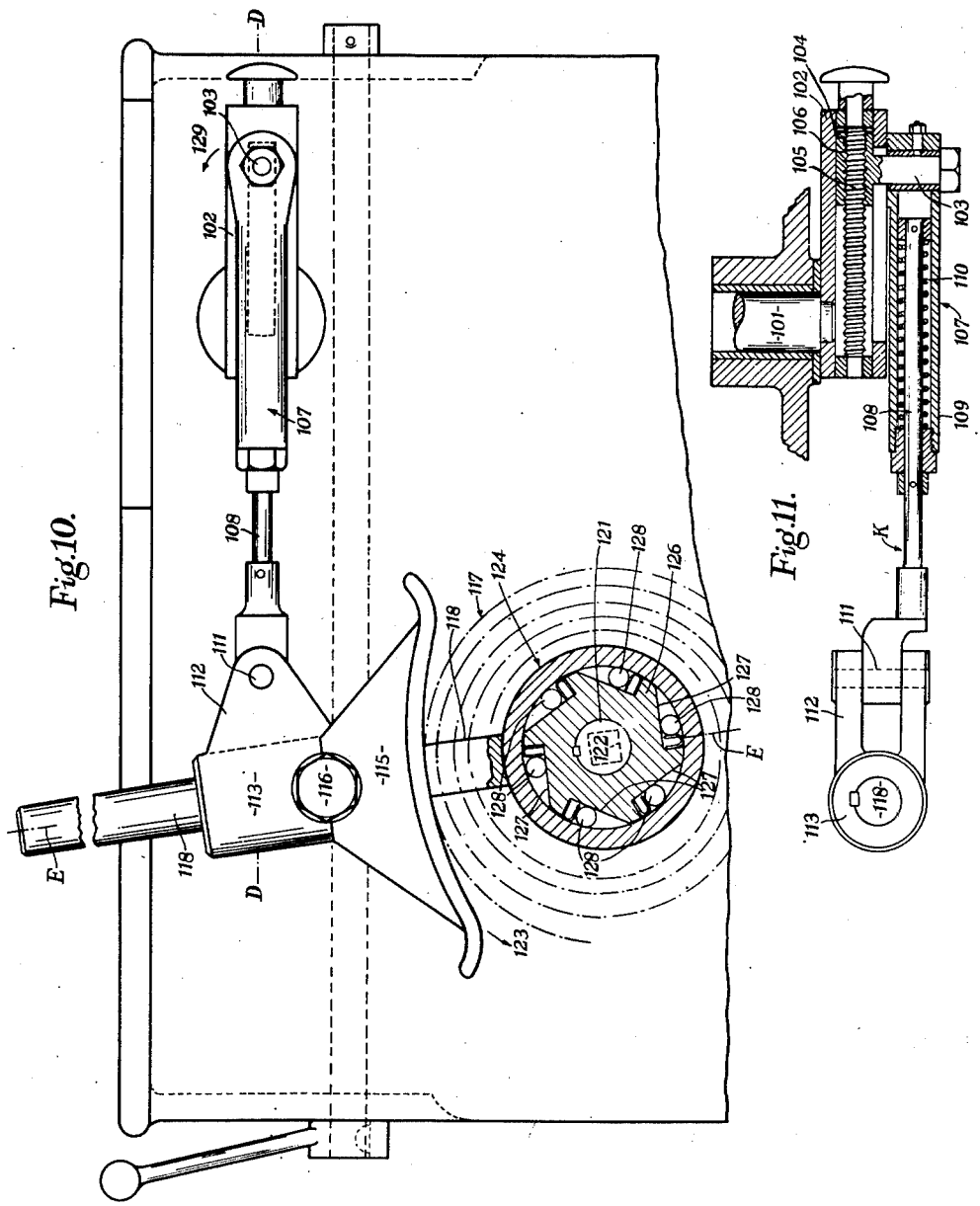

April 5, 1955  J. A. WAKEFIELD  2,705,509
MACHINES FOR MANUFACTURING WIRE FABRIC
Filed Oct. 3, 1951  11 Sheets-Sheet 8

INVENTOR
JOSEPH ANTHONY WAKEFIELD
BY
ATTORNEY

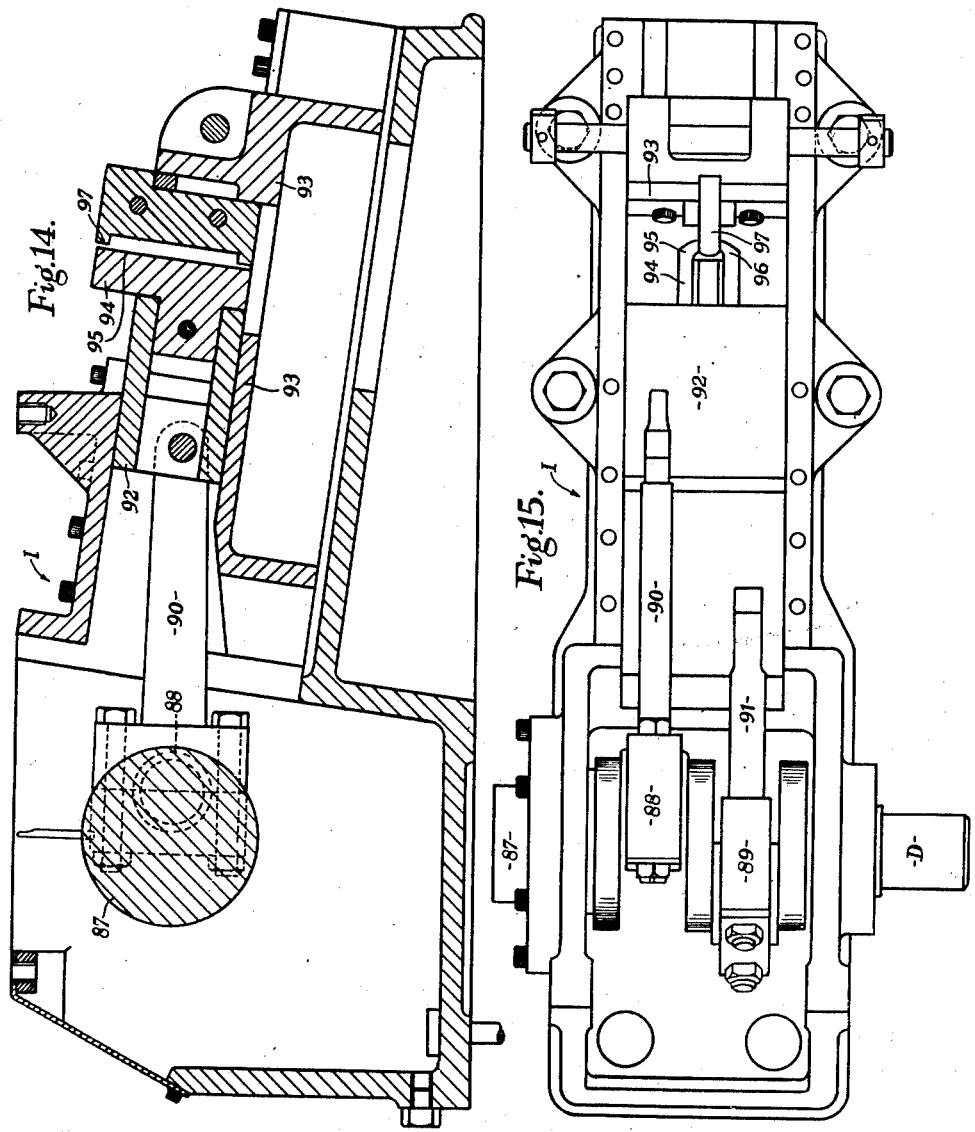

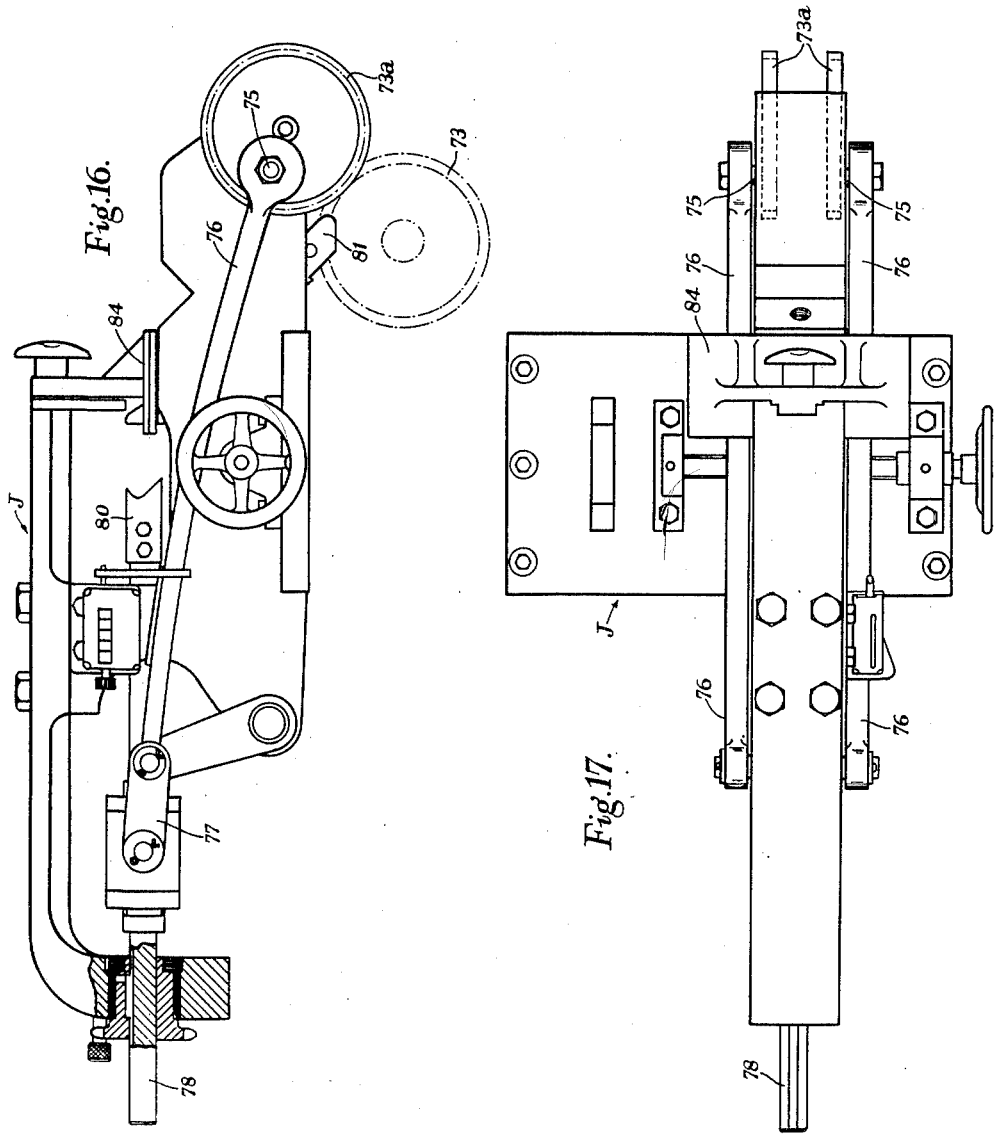

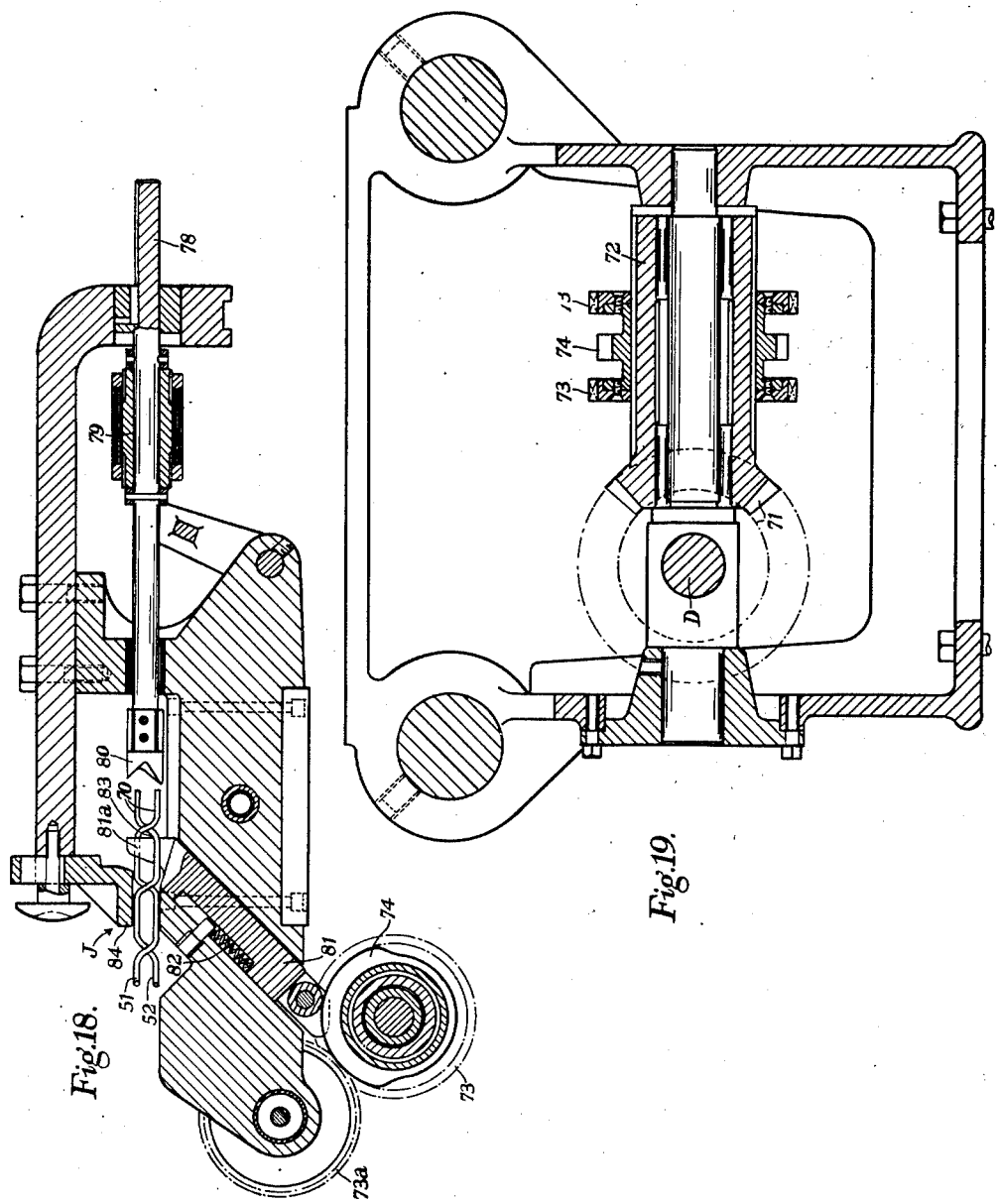

United States Patent Office 2,705,509
Patented Apr. 5, 1955

2,705,509

MACHINES FOR MANUFACTURING WIRE FABRIC

Joseph Anthony Wakefield, Wrotham, England, assignor to Durafencing Limited, London, England, a registered British company Application October 3, 1951, Serial No. 249,584

2 Claims. (Cl. 140—24)

This invention has reference to a machine for manufacturing wire fabric or so called "chain link fabric" of quadrangular or square mesh and which is particularly, although not exclusively, used for fencing.

The invention concerns a machine of the kind in which a length of wire, or two lengths of wire fed from two sources are wound into zig-zag form on a flat forming bar or blade rotating in a stationary worming coil or so called "giraffe" and the wound wire is interlinked or interlaced with the last row of the chain link fabric being made. In this machine, provision is made to stop rotary motion of said forming bar after interlacing is effected and a single revolution shaft is then brought into operation and drives mechanism adapted to sever the interlaced wire from the coiled supply and also to knuckle or turn over the sharp barbed wire ends formed by the severing operation and which are located at the side edges of the fabric. The wire fabric is advanced in a step-by-step motion and the operations of coiling and interlacing and then severing and turning over of the barbs take place in automatically controlled cycles.

A known driving mechanism for performing these operations automatically comprises a driving shaft, a former blade shaft which is separate from the driving shaft and a single revolution shaft driven from the main shaft for actuating the other parts of the machine operating to produce the fabric, the operation of the former blade and the single revolution shaft being under the control of a clutch on the main shaft which permits the former blade shaft and the single revolution shaft to come into operation alternately, the operation of the clutch being itself under control of a trip mechanism driven from the main shaft.

One of the objects of the present invention is to provide an improved knuckling mechanism.

According to the present invention, a machine of the kind hereinbefore specified is provided with an epicyclic gear train for driving the weaving spindle and the single revolution shaft and a control mechanism combined with the epicyclic gear train is adapted to co-operate therewith in such a manner as to cause automatically the drive to be transmitted alternately to the weaving spindle and the single revolution shaft and to hold one of them static while the other is in motion.

In carrying the invention into effect, the epicyclic gear train comprises a sun pinion on a driving shaft, planet pinions on an externally toothed planet carrier and an internally toothed annulus engaged by the planet pinions, the planet carrier and the toothed annulus being rotatably mounted on the driving shaft and being adapted to drive respectively the weaving spindle and the single revolution shaft.

The control mechanism comprises a system of levers including a spring loaded control lever provided with abutments adapted alternately to positively engage the toothed planet carrier, and a toothed dog on the single revolution shaft, said control lever being disconnected from the dog and connected to the planet carrier by a moving abutment driven from the weaving spindle drive and said lever being disconnected from the planet carrier and connected to the dog by a tripping mechanism. The tripping mechanism incorporates a trip lever moved by a cam on the dog, said lever being connected to a transverse lever of the system in such a manner that the transverse lever is lifted out of engagement with the abutment. The transverse lever is raised by a ramp and roller co-operation which transmits the movement through a slot in the said lever engaged by means of a pin and slot connection between the transverse lever and the connection. The moving abutment is on a chain driven through gearing from the weaving spindle.

The machine according to the invention also incorporates special features relating to the worming coil, and the winding mechanism, which features are fully described later and which form the subject of our concurrent applications Serial Nos. 249,583 and 249,586.

Figure 7:
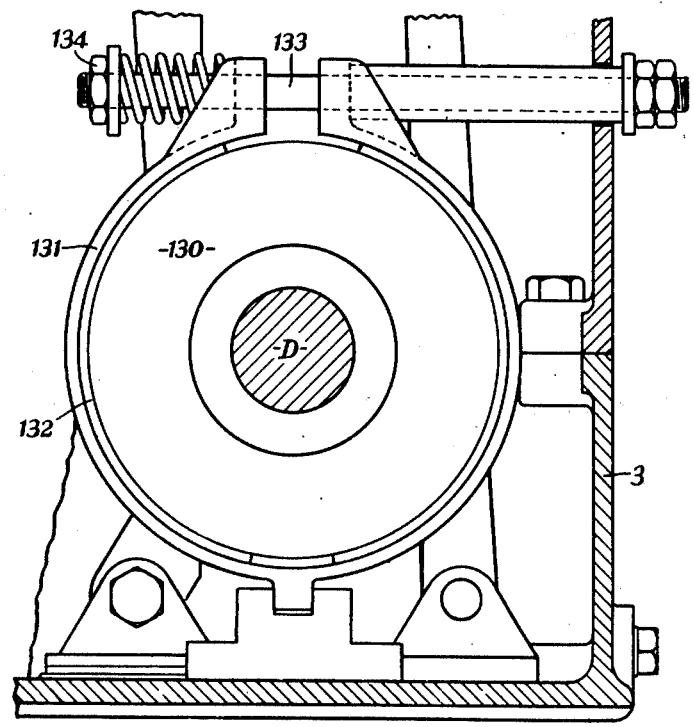
Figure 12:
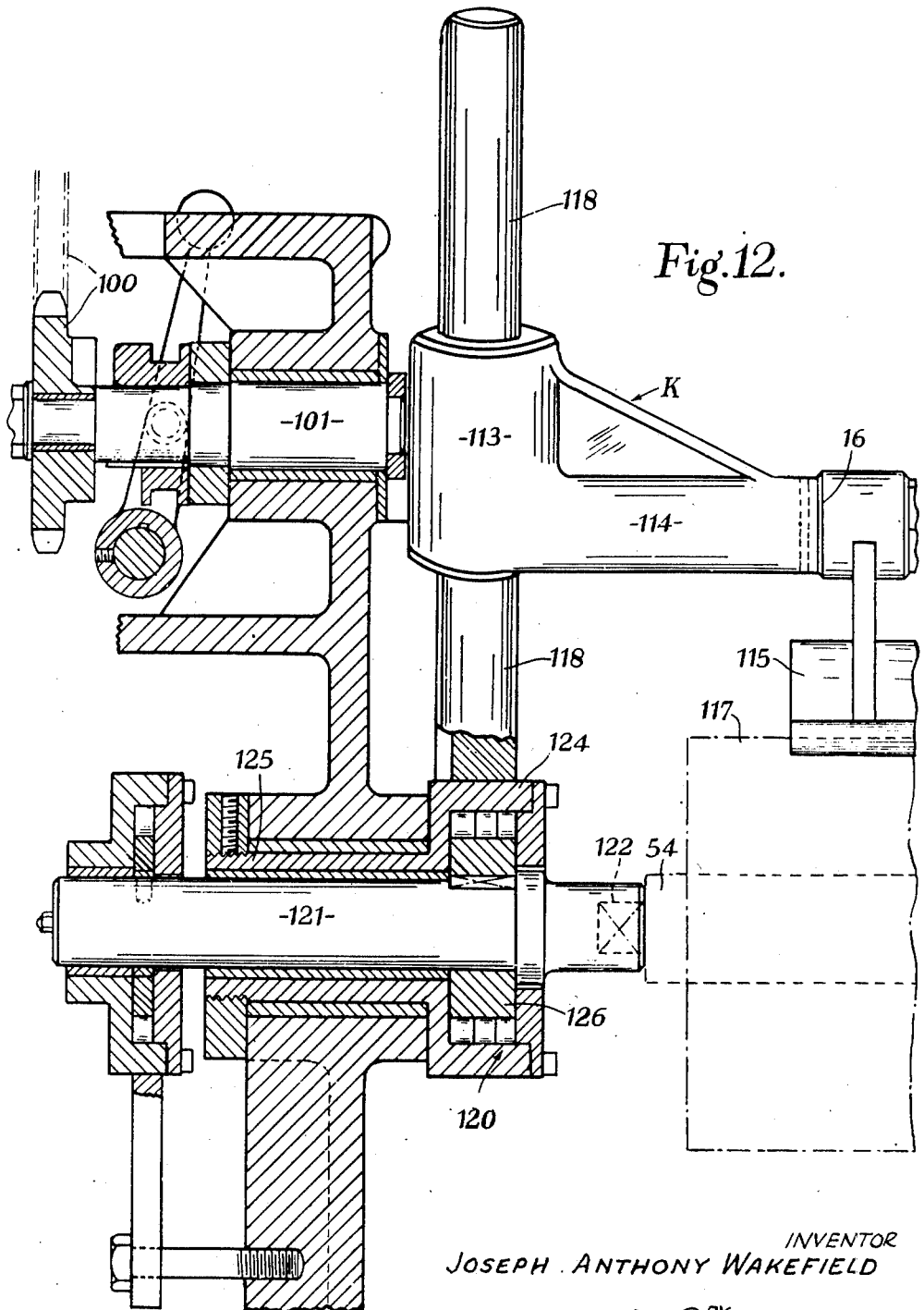

A satisfactory embodiment of a machine, according to the invention, for manufacturing such wire fabric is illustrated by way of example on the accompanying drawings:

Fig. 1 is an elevation showing the general arrangement of the machine.
Fig. 2 is a plan of Fig. 1.
Fig. 3 is a longitudinal section of the power transmission.
Fig. 4 is a transverse section of Fig. 3.
Fig. 5 is a scrap section of Fig. 4 taken on dotted line A—A.
Fig. 6 is a diagrammatic section taken on the dotted line B—B, Fig. 4.
Fig. 7 is a sectional detail of Fig. 6 taken on the dotted line C—C.
Fig. 8 is a longitudinal section of the forming bar and worming coil.
Fig. 9 is an end view of Fig. 8.
Fig. 10 is a view, partly in section, taken transversely of the machine and showing the wind-up mechanism for rolling up the wire fabric as it comes from the machine.
Fig. 11 is a section of Fig. 10 taken on the dotted line D—D.
Fig. 12 is a section of Fig. 10 taken on the dotted line E—E.
Fig. 13 is a detail of the winding spindle.
Fig. 14 is a longitudinal section of the wire cutting mechanism.
Fig. 15 is a plan of Fig. 14.
Fig. 16 is a side elevation of the knuckling mechanism.
Fig. 17 is a plan of Fig. 16.
Fig. 18 is a longitudinal section of a knuckling unit as seen in Fig. 16.
Fig. 19 is a sectional detail of the transmission for the knuckling mechanism.
Fig. 20 is a plan view of the fabric and illustrates diagrammatically an anvil engaging and supporting a corner of an end of the fabric and the operative end of the knuckling mechanism ready to effect knuckling.

The machine is designed to manufacture wire fabric or so called "chain link fabric" of square or quadrangular mesh; a section of which is illustrated by Fig. 20. This fabric consists of interlaced or interlinked zig-zag wires (52, 53) and is of indeterminate length, whereas the width is determined by the manufacturer in relation to trade requirements; a common and satisfactory width of such fabric for use as field fencing is of approximately six feet.

The wire fabric making machine, which is comparatively long and narrow, has a frame 1 supported on pedestals 2 and comprises the following essential features:

A power transmission mechanism A having a driving shaft B; a weaving spindle C and a single revolution shaft D, the weaving spindle C being arranged at the front of the machine, the spindle C and the shaft D being adapted to be driven alternately by the mechanism A while the driving shaft B is rotating;

A control mechanism E co-operating with the mechanism A;

A flat coiling blade F driven by the weaving spindle C;

A fixed, cylindrical worming coil G in which the blade F rotates;

A bi-sectional weaving tube H, co-axial with the blade F, adapted to be opened and closed from the operation of the single revolution shaft D;

A wire cutting mechanism I operated from the single revolution shaft D;

A knuckling mechanism J operated from the single revolution shaft D;

A fabric winding mechanism K operated from the single revolution shaft D.

The power transmission mechanism and the control mechanism

This mechanism A (Figs. 3 to 7), includes a gear box 3 supporting in suitable bearings the driving shaft B, the weaving spindle C and the single revolution shaft D, all arranged in parallel order and longitudinally of the machine. The shaft B drives epicyclic gearing comprising a sun pinion 4 fast on the shaft B, planet pinions 5 mounted on radial stub shafts 6 fast on a circular planet carrier 7 and an internally toothed annulus 8. The planet carrier 7 is provided with peripheral teeth 9 and is mounted on the shaft B by means of a loose sleeve 10. The sleeve 10 drives through spur gearing 11, 12, the weaving spindle C and a worm-wheel drive 13, 14 from the spindle C, via bevel gearing 15, 16, transmits motion to a sprocket 17 driving a chain 18 carrying an abutment 19 and passing over another sprocket (Fig. 1).

The toothed annulus 8 is carried by a sleeve 20 loosely mounted on the shaft B, and a pinion 21 fast on the sleeve 20 transmits through an intermediate wheel 22 motion to a pinion 23 fast on the single revolution shaft D.

Fast on the single revolution shaft D is a dog 24 having a tooth 25 and a cam form 26, the dog 24 together with the toothed planet carrier 7 lying close to a control lever 27 of the mechanism E. The control lever 27 is rockable in a vertical plane about an axis 27a and is provided with two shoulders 28, 29; a trip lever 30 rockably mounted in a vertical plane about an axis 31, lies in the path of the dog 24. The upper end of the control lever 27 is pivoted at 32 to one end of a transverse lever 33 of the control mechanism E, this lever 33 being loaded by a tension spring 34 which urges the lever 33 towards the right of the gear box 3 (Fig. 4). The other end of the lever 33 has a hook 35 projecting outside the box 3 and in the path of the abutment 19. The upper end of the trip lever 30 is connected at 36 to ends of a pair of links 37 whose other ends carry co-axial rollers 38, 39. The roller 38 engages a longitudinal slot 40 in the lever 33 and the rollers 39 ride on a fixed ramp 41 on the inside of the box 3.

In the position occupied by the parts of the transmission mechanism A shown in Figs. 3 and 4, the control mechanism E is holding the single revolution shaft D stationary by the co-acting engagement of the shoulder 29 with the tooth 25. Therefore, the transmission from the shaft B is through the sun pinion 4, planet pinions 5, planet carrier 7, sleeve 10 and gearing 11, 12 to the weaving spindle C and the sprocket 17. It will be appreciated that during this cycle of operations, the toothed annulus 8 and its gearing 21, 22, 23 is static and the planet pinions 5 idle around the then stationary toothed annulus 8.

It will be seen from Fig. 4 that the moving abutment 19 is about to engage the hook 35 of the lever 33 and when engagement takes place the abutment 19 transmits movement to the lever 33 in the direction of the arrow 61. This operation causes the lever 33 to impart pivotal movement to the control lever 27 in the direction of the arrow 62 and simultaneously disengages the shoulder 29 from the tooth 25 on the dog 24 and engages the shoulder 28 with a tooth 9 on the planet carrier 7. This operation takes place quickly and with precision and as the planet carrier 7 is now rendered static, the drive to the weaving spindle C and the sprocket 17 stops and the single revolution shaft D is driven from the shaft B from the epicyclic gearing by the sun pinion 4 transmitting motion to the planet pinions 5 and thence to the toothed annulus 8, its sleeve 20, pinion 31 and wheels 22, 23.

The turning of the single revolution shaft D is employed to carry out automatically several important operations in the machine, and these operations will be specifically referred to in the further description of the machine and in its operation.

The revolution of the single revolution shaft D is controlled initially by the cam 26 on the dog 24 in the following manner: As the cam 26 is turned in the direction indicated (Fig. 4), it co-acts with the trip lever 30 moving it clockwise. The rods 37 connecting the trip lever 30 with the rollers 38, 39 are simultaneously moved in the direction of the arrow 63 and the rollers 39 ride up the ramp 41. As the co-axial roller 38 is engaging the slot 40 in the lever 33, the latter is lifted by the roller ramp co-operation 38, 41 about the pivotal connection 32, thus raising and releasing the hooked end 35 of the lever 33 from engagement with the abutment 19, whereupon the energy of the tension spring 34 acting on the lever 33 pulls the lever 33 to the right and simultaneously tilts the control lever 27 in the direction of the arrow 64 so as to cause the shoulder 29 to engage the tooth 25, as shown in Fig. 4 and arrest the single revolution shaft D. Thus, the planet carrier 7 can be driven by the epicyclic train as before described and the weaving spindle C will be driven. Under this arrangement, the weaving spindle C and the single revolution shaft D are alternately driven from the continuously rotating shaft B.

Associated with the single revolution shaft D is a co-axial friction loading device (Figs. 6, 7) consisting of a brake drum 130 fast on the shaft D and running in a split band 131 having a friction lining 132. The tension on the band 131 can be adjusted by means of a spring loaded screw and bolt 133, 134.

The function of the friction device is to equalise the load on the single revolution shaft D with that of the wire load on the weaving spindle C.

A rubber buffer 65 is provided on the lever 33 and adapted to engage the gear box 3 so as to avoid or minimise the possibility of the control lever vibrating or chattering.

The weaving spindle, coiling blade and worming coil

The worming coil G has a two-start helical slot 42 cut in its wall, the slots 42 extending between the counterbored ends 43 of the coil G.

The worming coil G or so called "Giraffe" is arranged inside a tubular support 44 formed with several holes 45 permitting of supply of a lubricant from a source 45a to the coil G and coiling blade F. The latter is coupled at one end 46 with the weaving spindle C and a bearing ring 47 on the blade F forms a rotary abutment with the adjacent end of the worming coil G. The other end 47a of the blade F extends beyond the exit of the worming coil G and terminates before the location of the cutting mechanism I. Round section wire, wound on drums (not shown), to be made into fabric (Fig. 20) is supplied from two sources 48, 49 to the entry points 50, 51 of the worming coil G and the leading ends of the wires 48, 49 and initially bent into engagement with the coiling blade F. As the weaving spindle C rotates the coiling blade F, the wires 48, 49 are drawn by the rotary motion into the coil G and there is formed on the coiling blade F two zig-zag rows of overlapping coils 52, 53 (Fig. 8). As coiling proceeds, the coilings 52, 53 are traversed along the blade F and into the co-axial bi-sectional weaving tube H.

The main stress of coiling is imposed on the back of the spiral slots at M (Fig. 8), and after a period of service grooves are worn at M in the slots. The result is that zig-zag spirals 52, 53 become distorted at the bends. When this wear becomes apparent, it is but required that the worming coil G is reversed when the counterbored exit end becomes the inlet end for the wires 48, 49, and the latter are coiled about fresh corners M of the two-start spiral slots so that efficient coiling can be ensured without cost of a replacement, the manufacture of which entails raw material and skilled labour using machine tools.

The weaving tube

The bi-sectional weaving tube H has its front section 85 hinged at its lower end to a fixed rear section so that the tube H can be opened and closed; the front section 85 is spring loaded into the closed position and adapted to be opened by a simple known mechanism consisting of a lever 85a pivotally connected to the section 85 and rocked at the opportune moment by a cam on the single revolution shaft.

This weaving tube and its mode of operation is known in the art.

For an understanding of the sequence of operations, it is convenient to state here that after making a few lengths of coils 52, 53 into a short length of fabric, an opposite bias is placed on the preliminary meshes of the fabric in order that as the growth of fabric proceeds, the fabric can be extended upwardly and then horizontally over the top of the machine and then downwardly where it is to be rolled on a winding spindle 54 extending longitudinally under the machine. For this purpose, a weighted roller 55 is arranged longitudinally at the rear of the machine and the upwardly extending fabric is connected to it; a system of hooks (Fig. 1), comprising front hooks 56 and rear hooks 56c is arranged at the front of the machine and is mounted on a rockable shaft 56a which receives its motion from an arm 56b co-acting with a cam (not shown) which is driven from the single revolution shaft D. The function of these hooks 56, 56c is that as winding proceeds, the rear hooks 56c move away from the mesh of the fabric and the front hooks 56 momentarily engage the next mesh of the fabric as it ascends from the weaving tube H. As the winding step is completed, the front hooks 56 disengage and the rear hooks 56c are restored into engagement with the mesh and hold the latter in the weaving tube H in readiness for interlacing or interlinking of the zig-zag wires fed into the weaving tube H upon the resumption of operation of the weaving spindle C. The fabric, as it grows, passes over and is supported on a pair of elevated bars 57 extending longitudinally of the machine. As will be seen from Fig. 1, the knuckling mechanism J in two units is located above the bars 57.

The wire cutting mechanism

This mechanism I (Figs. 14 and 15) is arranged transversely of the machine and in advance of the inlet end 86 of the weaving tube H and is better seen from Figs. 14 and 15. The mechanism I is driven from the single revolution shaft D through a crank shaft 87 having a pair of cranks 88, 89 whose connecting rods 90, 91 are connected respectively to a pair of slides 92, 93 adapted to be reciprocated in opposite directions. The slide 92 carries a back cutter 94 having two cutting edges 95, 96 and the slide 93 is provided with a single front cutter 97. In Figs. 14, 15, the cutting position is illustrated whereas the slides 92, 93 can be moved apart sufficiently to allow the coiled wire 52, 53 coming from the coiling blade F to rotate freely between the cutters 94, 97 and enter the weaving tube H. When the weaving spindle C becomes static and the single revolution shaft is turned, the cutting mechanism I comes quickly into operation and severs the coiled wire 52, 53 so that the subsequent step-wise operation of the wind-up mechanism K can be carried out.

The knuckling mechanism

This mechanism J (Figs. 16, 17, 18, 19), which is driven by the single revolution shaft D is located on top of the machine and beside the longitudinal edges 69 of the fabric passing over the bars 57; the mechanism J consists of two similar units, the function of which is to turn back the barbs 70 (Figs. 18 and 20) formed when the cutting mechanism I cuts the overlapping coils 52, 53.

The single revolution shaft D transmits through bevel gearing 71 motion to a sleeve 72 on which spur wheels 73 and a cam 74 are splined so as to permit of their axial adjustment; the wheels 73 mesh with wheels 73ª provided with cranks 75 and connecting rods 76. These connecting rods 76 are coupled through links 77 to a reciprocating slide 78 arranged in bearings 79 and provided at one end with a knuckling tool 80. The cam 74 operates on a spring loaded anvil 81 adapted to slide upwardly and downwardly, the bias of the spring 82 normally urging the anvil 81 downwardly. The knuckling mechanism J is arranged and timed to operate in such a manner that the cam 74 pushes upwardly the spring loaded anvil 81 for engaging its tip 81ª at the back 83 of interlaced ends of the mesh so as to form an abutment while the knuckling tool 80 advances into engagement with the barbs 70 and turns them back upon the outermost limbs of the fabric. This general idea is readily seen at Figs. 18 and 20 which show the anvil in position supporting the back of the interlaced mesh and the knuckling tool 80 ready to advance. The motions of the anvils 81 and knuckling tools 80 are virtually simultaneous.

By splining the wheels 73 and cam 74 on the driven sleeve 72, it is possible to adjust the mechanism J transversely relative to the top of the machine in order to vary the positions of the tool 80 and the anvil 81 with respect to the fabric; this adjustment is relatively small and, in practice, the variation does not exceed approximately four inches. Associated with each knuckling mechanism J is a foot 84 positioned above the fabric and adapted to maintain in a flat state as the fabric moves intermittently over the bars 57 by the winding-up mechanism K.

The winding-up mechanism

This mechanism K (Figs. 10, 11 and 12) is arranged transversely of and under the machine for winding automatically the fabric on the winding spindle 54 arranged longitudinally under the machine. The mechanism is driven from the single revolution shaft D (not shown in Figs. 10, 11 and 12) by a chain sprocket drive 100 to a crank shaft 101 transmitting motion to a longitudinally slotted crank arm 102 fitted with a crank pin 103; the throw of the crank can be adjusted by mounting the crank pin 103 on a slide 104 and adjusting the slide 104 relatively to the crank arm 102 by means of a traversing screw and nut co-operation 105, 106. A spring loaded connecting rod 107 consisting of piston member 108, cylinder 109 and spring 110, is jointedly connected at 111 to a bracket 112 fast with a sleeve 113.

The sleeve 113 has a right angled extension 114 on which a foot or shoe 115 is pivoted at 116, this foot or shoe 115 resting on the periphery 117 of the fabric rolled on the winding spindle 54 by this mechanism. The sleeve is splined on an oscillating arm 118 having its lower end connected to one element of a one-way friction clutch 120 arranged on a stub shaft 121 which is the axis of the winding spindle 54; an end of the shaft 121 is provided with a square socket 122 in which one end of the spindle 54 engages. The crank mechanism 102, 103 causes the arm 118 to oscillate about the shaft 121 and the clutch 120 is arranged to drive the shaft 121 and the spindle 54 in the direction of the arrow 123 (Fig. 10) and to idle in the other direction. The friction clutch 120 comprises a hollow, cylindrical element 124 fast with the arm 118 and mounted by a sleeve 125 on the shaft 121 in combination with an inner cylindrical element 126 splined on the shaft 121, this element 126 having several steps 127 in its periphery for accommodating rollers 128. The crank mechanism 102, 103 turns in an anti-clockwise direction as indicated by the arrow 129 (Fig. 10), and during its outward stroke the clutch operates and turns the shaft 121 together with the winding spindle 54 clockwise, thereby performing a fabric winding step. On the return stroke, of the said crank mechanism, the clutch 120 is ineffective so that the shoe 115 rides over the periphery of the fabric 117 without turning it. Thus, as the single revolution shaft D turns, the arm 118 completes automatically an oscillation, the first half of which restores the arm 118 from the position it was previously moved into in winding fabric on the spindle 54 so that it can again repeat the winding operation on the second half of the cycle.

The operation of automatically winding the fabric on the spindle 54 takes place on completion of the knuckling operation, the weaving tube H being automatically opened as winding is imminent and the hooks 56 being released and re-engaged with the mesh during and after completion of the winding operation.

As the diameter of the fabric progressively increases, a constant winding movement is transmitted to the winding spindle 54 so that the same amount of fabric is wound upon it, irrespective of fabric diameter. This is made possible by the upward sliding motion of the sleeve 113 on the arm 118 due to the foot or shoe 115 resting on the periphery 117 of the fabric and progressively lifting the sleeve 113. In this way, the pivot 111 is always maintained at a constant distance from the periphery 117 of the roll.

As the manufactured fabric increases in diameter, the sleeve 113 slides up the arm 118 and when the required diameter has been reached, the roll with the winding spindle 54 is removed from the machine, the roll being sleeved off the spindle 54 by removal of a clamping device 130 (Fig. 13) and withdrawal of a bar 131 previously clamping to the spindle 54 one or more of the initial turns of the fabric.

It will be seen, therefore, that the position the sleeve 113 occupies on the oscillating arm 118 is responsive to or controlled by the diameter of the fabric being rolled on the spindle so that the amplitude of oscillation will vary, in that with a small diameter of fabric the angular movement of the arm will be greater than when the diameter is large, although the same amount of fabric will be wound per oscillation.

Operation

The transmission of motion alternately to the weaving spindle C and single revolution shaft D has been fully explained, and during rotation of the weaving spindle C when the single revolution shaft D is static, the weaving spindle C drives the coiling blade F upon which the wires 48, 49 are coiled and are traversed into the co-axial and bi-sectional weaving tube H and one coil is interlinked or interlaced with the last link of the fabric. As soon as the drive to the weaving spindle C ceases, the single revolution shaft D is rotated, the operation of changing over from one drive to the other taking place practically instantaneously.

The single revolution shaft D operates the wire cutting mechanism I and at the same time, or practically the same time, the knuckling mechanism J comes into operation.

Subsequent to knuckling, the single revolution shaft D operates the mechanism for opening the weaving tube H, whereupon the winding mechanism K is operated. During the operation of the winding mechanism K, the hooks 56 are released and re-engaged with the fabric.

It will thus be seen that the operations hereinafter referred to in the claims as "driving the other parts of the machine" are all performed during one revolution of the shaft D and are constantly repeated in alternate order with the driving of the weaving spindle C so long as the machine is running.

What I claim is:

1. In a machine of the type described: a base frame; and a knuckling mechanism comprising a base mounted on said base frame and transversely adjustable with respect to said frame, said base having an upwardly inclined aperture, an anvil slidably disposed in said aperture and having an upper end extending upwardly out of the aperture, a knuckling tool reciprocably mounted on the base for movement toward and away from the upper end of said anvil; a drive shaft on said base frame and extending transversely thereof, said drive shaft having a cam engageable with the lower end of said anvil for moving said anvil upwardly, a transversely extending shaft on said base being parallel to said drive shaft, meshing gears on said shafts, and means connecting the gear on said transversely extending shaft to said knuckling tool for reciprocating said knuckling tool in synchronism with said anvil whereby said knuckling tool is moved toward said upper end of said anvil when said anvil is moved upwardly toward said knuckling tool, the cam and the gear on said drive shaft being adjustable on said drive shaft transversely of said base frame.

2. In a machine of the type described: a base frame; and a knuckling mechanism comprising a base mounted on said base frame and transversely adjustable with respect to said frame, said base having an upwardly inclined aperture, an anvil slidably disposed in said aperture and having an upper end extending upwardly out of the aperture, a knuckling tool reciprocably mounted on the base for movement toward and away from the upper end of said anvil; a drive shaft on said base frame and extending transversely thereof, said drive shaft having a cam engageable with the lower end of said anvil for moving said anvil upwardly, a transversely extending shaft on said base being parallel to said drive shaft, meshing gears on said shafts, and means connecting the gear on said transversely extending shaft to said knuckling tool for reciprocating said knuckling tool in synchronism with said anvil whereby said knuckling tool is moved toward said upper end of said anvil when said anvil is moved upwardly toward said knuckling tool, the cam and the gear on said drive shaft being adjustable on said drive shaft transversely of said base frame; and a foot mounted on said base and disposed inwardly of said anvil and knuckling tool for holding flat a fabric whose ends are being operated on by said knuckling tool.

References Cited in the file of this patent

UNITED STATES PATENTS

| | | |
|---|---|---|
| 889,815 | Schmid | June 2, 1908 |
| 1,085,594 | Craven | Feb. 3, 1914 |
| 1,096,080 | Wagner | May 12, 1914 |
| 2,202,442 | Blashill | May 28, 1940 |